(12) United States Patent
Jiang et al.

(10) Patent No.: US 11,170,583 B2
(45) Date of Patent: Nov. 9, 2021

(54) ELECTRONIC APPARATUS, METHOD AND SERVER AND METHOD FOR VERIFYING VALIDITY OF LOG DATA OF VEHICLE

(71) Applicant: KABUSHIKI KAISHA TOSHIBA, Tokyo (JP)

(72) Inventors: Dan Jiang, Tokyo (JP); Toshiyuki Kito, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 721 days.

(21) Appl. No.: 15/958,955

(22) Filed: Apr. 20, 2018

(65) Prior Publication Data
US 2019/0221051 A1    Jul. 18, 2019

(30) Foreign Application Priority Data

Jan. 15, 2018  (JP) .............................. JP2018-004508

(51) Int. Cl.
| G07C 5/00 | (2006.01) |
| G07C 5/08 | (2006.01) |
| H04L 9/32 | (2006.01) |
| G07C 5/04 | (2006.01) |
| H04L 29/08 | (2006.01) |
| H04L 29/06 | (2006.01) |

(52) U.S. Cl.
CPC .............. *G07C 5/008* (2013.01); *G07C 5/04* (2013.01); *G07C 5/08* (2013.01); *G07C 5/0841* (2013.01); *H04L 9/3236* (2013.01); *H04L 9/3247* (2013.01); *H04L 63/00* (2013.01); *H04L 63/123* (2013.01); *H04L 67/12* (2013.01); *H04L 63/14* (2013.01)

(58) Field of Classification Search
CPC . G07C 5/008; G07C 5/08; G07C 5/04; G07C 5/0841; G07C 5/0808; H04L 63/123; H04L 9/3247; H04L 9/3236; H04L 63/00; H04L 67/12; H04L 63/14
See application file for complete search history.

(56) References Cited

U.S. PATENT DOCUMENTS

| 8,004,404 | B2 | 8/2011 | Izumi et al. |
| 8,327,131 | B1 | 12/2012 | Hardjono et al. |
| 2006/0117184 | A1 | 6/2006 | Bleckmann et al. |

(Continued)

FOREIGN PATENT DOCUMENTS

| JP | 2009-110224 A | 5/2009 |
| JP | 2009-518762 A | 5/2009 |

(Continued)

*Primary Examiner* — Jeffrey C Boomer
(74) *Attorney, Agent, or Firm* — Knobbe, Martens, Olson & Bear LLP

(57) ABSTRACT

According to one embodiment, an electronic apparatus used in a vehicle generates a first to fourth log of the vehicle for a first to fourth period, a first to fourth code used to validity of the first to fourth log, a fifth code used to collectively determine a validity of the first log and the second log, a sixth code used to collectively determine a validity of the third log and the fourth log, and a seventh code used to collectively determine a validity of the first to fourth logs, and transmits the first to seventh codes to a server, and transmits the first to fourth logs to the server after a transmission of the first to seventh codes.

5 Claims, 6 Drawing Sheets

(56) References Cited

U.S. PATENT DOCUMENTS

| | | | |
|---|---|---|---|
| 2006/0231833 A1 | 10/2006 | Winings et al. | |
| 2007/0143629 A1 | 6/2007 | Hardjono et al. | |
| 2007/0180495 A1 | 8/2007 | Hardjono et al. | |
| 2009/0089860 A1 | 4/2009 | Forrester et al. | |
| 2011/0179477 A1 | 7/2011 | Starnes et al. | |
| 2015/0089236 A1* | 3/2015 | Han | H04W 12/10 |
| | | | 713/181 |
| 2016/0173505 A1* | 6/2016 | Ichihara | H04L 67/12 |
| | | | 713/170 |
| 2017/0180076 A1* | 6/2017 | Finlow-Bates | H04L 1/0045 |
| 2019/0044728 A1* | 2/2019 | Karmoose | H04L 9/12 |
| 2019/0349394 A1* | 11/2019 | Kishikawa | G07C 5/008 |
| 2020/0389791 A1* | 12/2020 | Takemori | H04L 63/10 |

FOREIGN PATENT DOCUMENTS

| | | | | |
|---|---|---|---|---|
| JP | 2010-074338 A | 4/2010 | | |
| JP | 2010-107832 A | 5/2010 | | |
| WO | WO1999040702 A1 * | 8/1999 | | |
| WO | WO 2007/023657 A1 | 3/2007 | | |
| WO | WO-2015048058 A1 * | 4/2015 | | H04L 9/3242 |

* cited by examiner

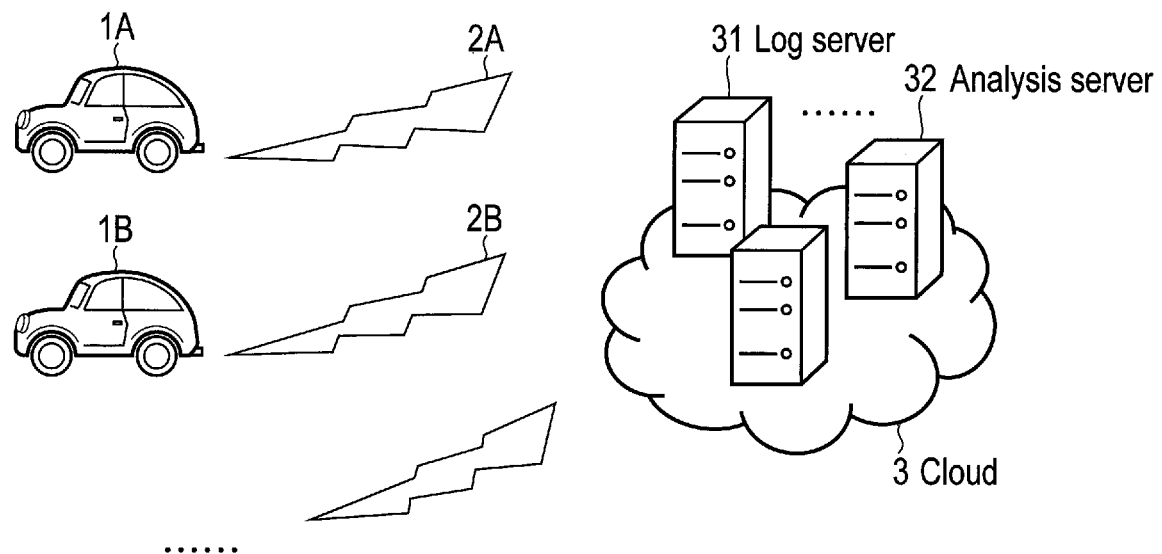
F I G. 1
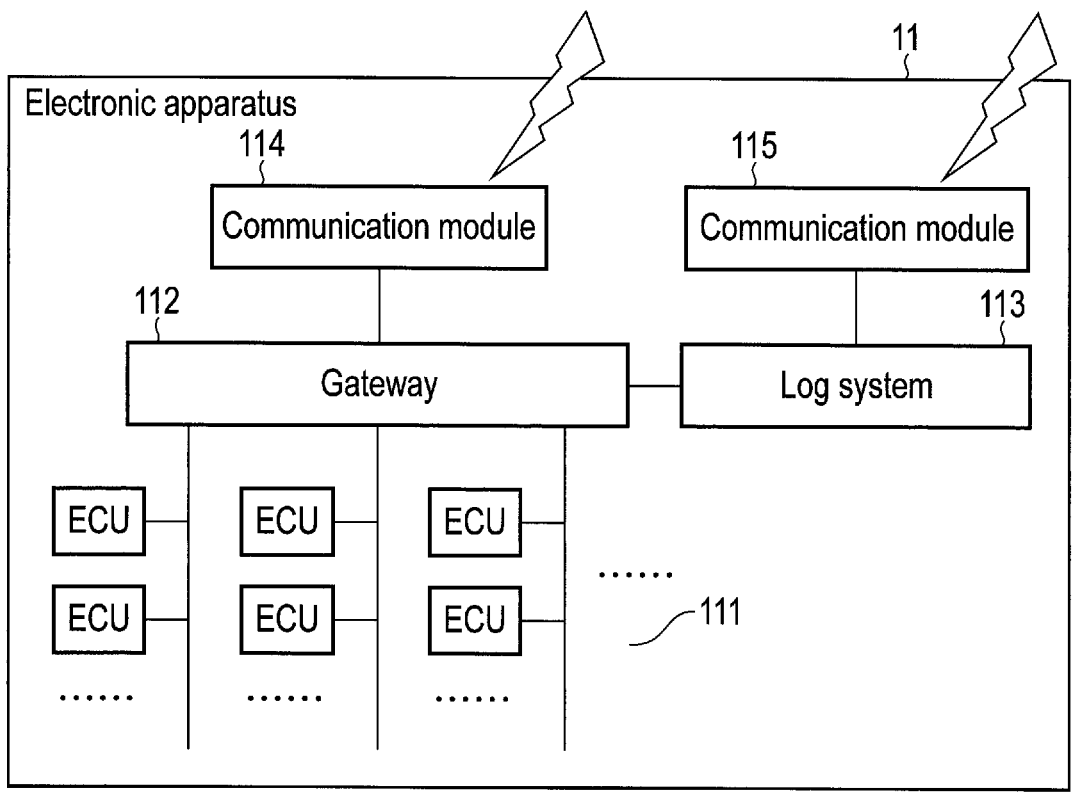
F I G. 2

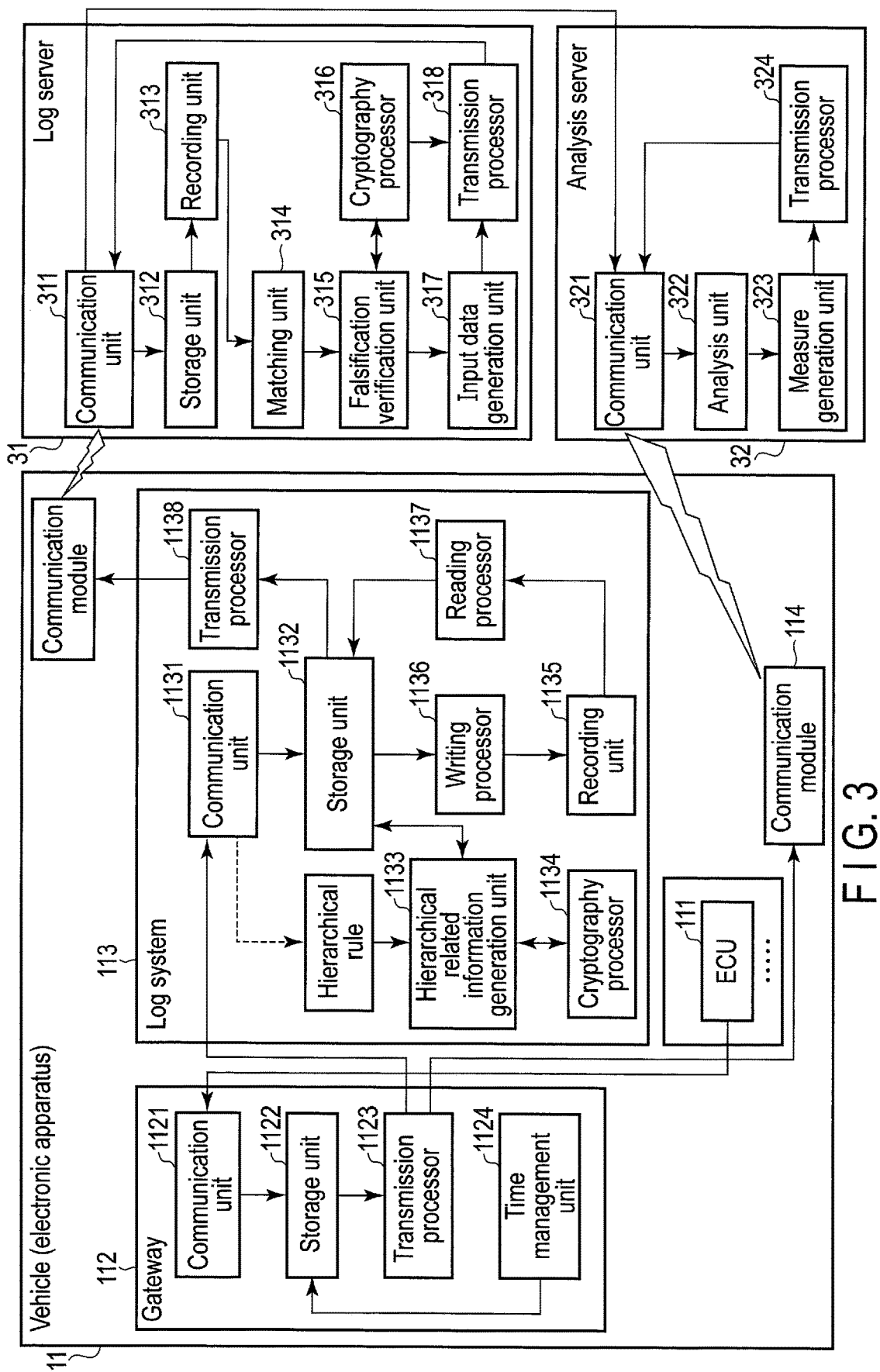
F I G. 3

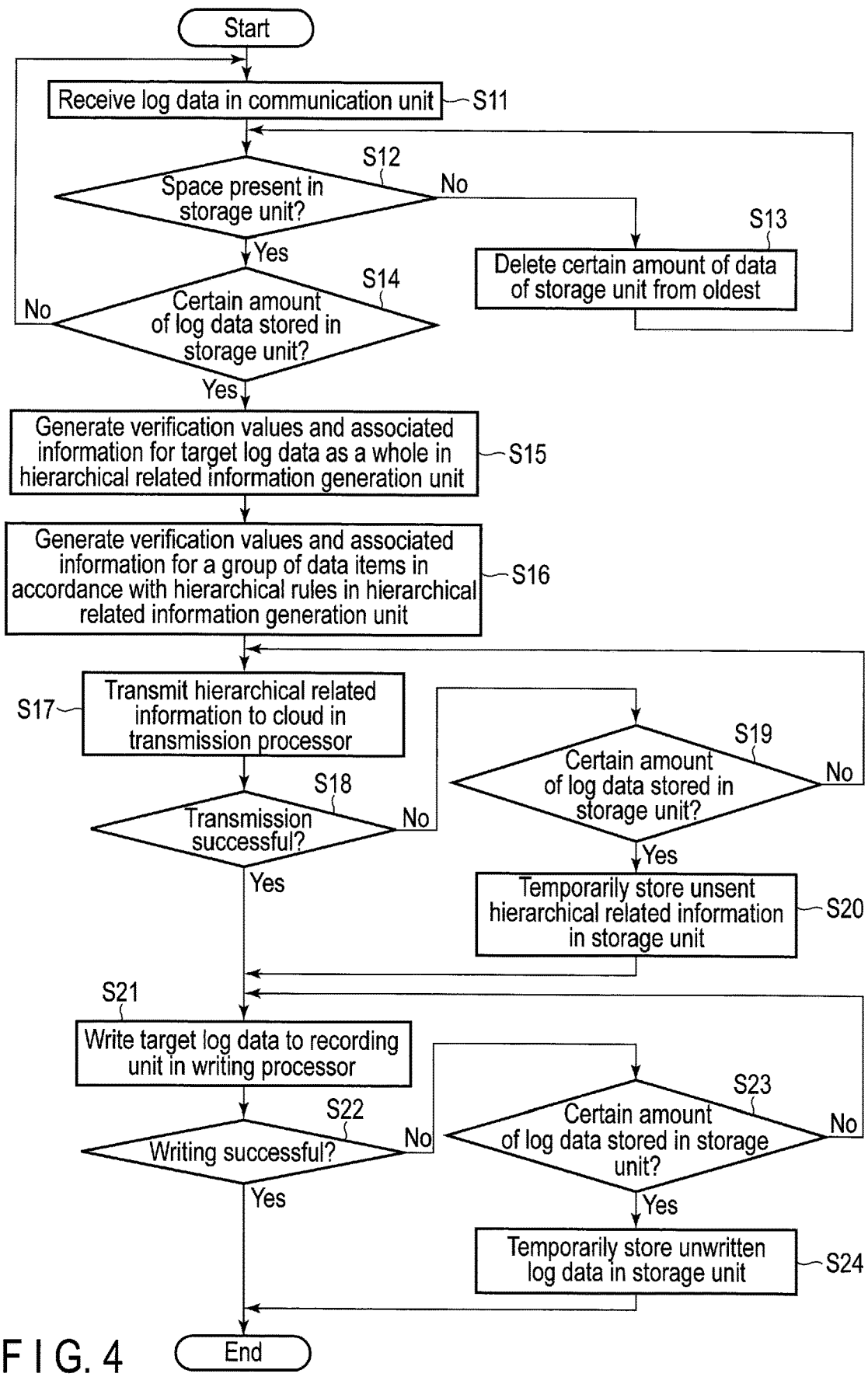
F I G. 4

| Column A | Column B | Column C | Column D | Column E | Column F | Column G | Column H | Column I | Column J |
|---|---|---|---|---|---|---|---|---|---|
| Identifier | Communication data | Time | Hierarchical verification value | | | | Associated information | | |
| | | | Fourth tier | Third tier | Second tier | First tier | Third tier | Second tier | First tier |
| CAN ID xx | Data xxx | YYYYMMDD 00:00:01:015 | Verification value aaa | Verification value ooo | Verification value sss | Verification value uuu | Third tier CAN ID 123 Number of data items 3 | Second tier CAN Number of data items 21 | Head YYYMMDD 00:00:01:015 |
| CAN ID xx | Data xxxx | YYYYMMDD 00:00:01:034 | Verification value bbb | | | | | | |
| CAN ID xx | Data xxx | YYYYMMDD 00:00:01:148 | Verification value ccc | | | | | | |
| CAN ID xx | Data xxx | YYYYMMDD 00:00:01:158 | Verification value ddd | Verification value ppp | | | Third tier CAN ID 456 Number of data items 16 | | |
| ... | ... | ... | ... | | | | | | |
| CAN ID xx | Data xxx | YYYYMMDD 00:00:01:299 | Verification value kkk | Verification value qqq | | | Third tier CAN ID 789 Number of data items 2 | | |
| CAN ID xx | Data xx | YYYYMMDD 00:00:01:310 | Verification value lll | | | | | | |
| CAN ID xx | Data xxx | YYYYMMDD 00:00:01:338 | Verification value mmm | | | | ... | | |
| ... | ... | ... | ... | | | | | | |
| Transmission destination xx | Data xxx | YYYYMMDD 00:00:01:963 | Verification value nnn | Verification value rrr | Verification value ttt | | Fourth tier Transmission destination 9876 Number of data items 1 | Ethernet Number of data items 33 | End YYYMMDD 00:00:05:210 Number of data items 54 |

F I G. 5

ELECTRONIC APPARATUS, METHOD AND SERVER AND METHOD FOR VERIFYING VALIDITY OF LOG DATA OF VEHICLE

CROSS-REFERENCE TO RELATED APPLICATIONS

This application is based upon and claims the benefit of priority from Japanese Patent Application No. 2018-004508, filed Jan. 15, 2018, the entire contents of which are incorporated herein by reference.

FIELD

Embodiments described herein relate generally to an electronic apparatus mounted on each vehicle and a server which verifies the log of the electronic apparatus in a system managing vehicles.

BACKGROUND

Recently, in vehicles such as automobiles, the environment for communicating with outside has been improved. However, the danger of attacks on information security from outside has been increased. Thus, it is necessary to detect abnormality in vehicles and the traveling environment of vehicles to prevent each vehicle from having an accident or prevent human life from being lost because of the attacks.

To detect abnormality, an electronic apparatus mounted on each vehicle sequentially obtains log data items in many types of control processes, generates falsification verification values, temporarily stores the combinations of the falsification verification values and the log data items in the recording medium of the vehicle, and transmits the combinations to a server or a group of servers (cloud) which detect abnormality via the Internet.

However, in the conventional system, it takes time to verify the falsification of log data items. In addition, when data is partially altered, the other log data items which are not altered cannot be secured.

Embodiments described herein aim to provide an electronic apparatus and a server configured to effectively verify the validity of log data of a vehicle and secure log data which is not altered.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is a block diagram showing the whole configuration of a vehicle management system according to an embodiment.

FIG. 2 is a block diagram showing the configuration of an electronic apparatus mounted on each vehicle shown in FIG. 1.

FIG. 3 is a block diagram showing the specific configuration of the electronic apparatus and the cloud of the system shown in FIG. 1.

FIG. 4 is a flowchart showing the processing procedure in the log system of the electronic apparatus shown in FIG. 3.

FIG. 5 shows a specific example of communication log data items and corresponding hierarchical verification values and associated information in the electronic apparatus shown in FIG. 3.

DETAILED DESCRIPTION

Figure 6:
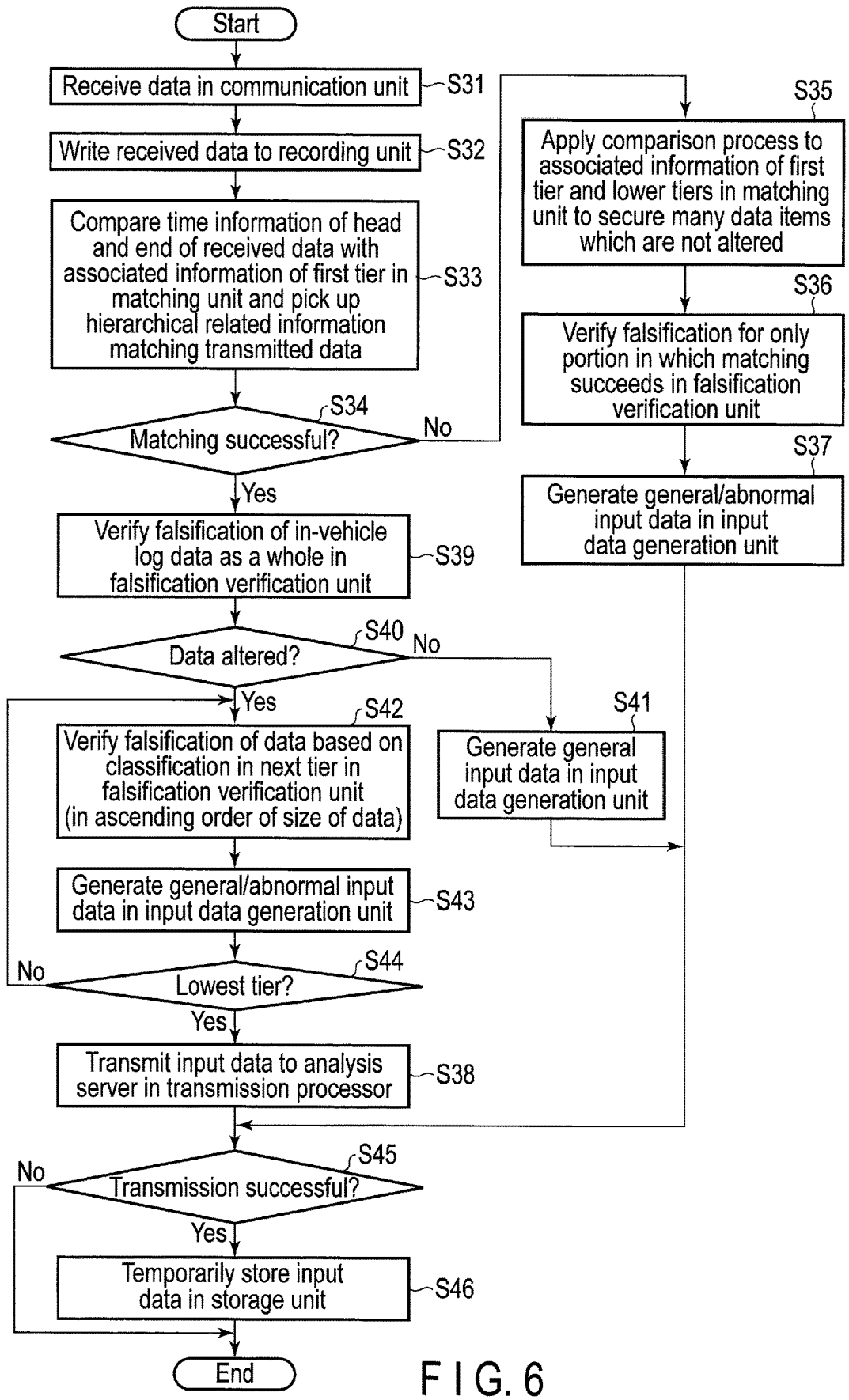
FIG. 6 is a flowchart showing the processing procedure for verifying falsification in the log server shown in FIG. 3.

Various embodiments will be described hereinafter with reference to the accompanying drawings.

In general, according to one embodiment, an electronic apparatus used in a vehicle includes a generator circuitry and a transmitter circuitry. The generator circuitry generates a log of the vehicle and a code verify validity of the log. The transmitter circuitry transmits the log of the vehicle to a server. The generator circuitry generates first log of the vehicle for a first period; a first code used to verify validity of the first log; a second log of the vehicle for a second period; a second code used to verify validity of the second log; a third log of the vehicle for a third period; a third code used to verify validity of the third log; a fourth log of the vehicle for a fourth period; and a fourth code used to verify validity of the fourth log; a fifth code used to collectively determine a validity of the first log and the second log; a sixth code used to collectively determine a validity of the third log and the fourth log; and a seventh code used to collectively determine a validity of the first to fourth logs. The transmitter circuitry transmits the first to seventh codes to the server, and transmits the first to fourth logs to the server after a transmission of the first to seventh codes.

The best mode to implement the present invention (hereinafter, an embodiment) will be described in detail with reference to the accompanying drawings.

In the following explanation, vehicles refer to, for example, automobiles, trucks, crane trucks, tractors, robots, trains and airplanes. A vehicle log may be any type of record as long as it is related to the state of the vehicle. For example, a vehicle log is a record related to the state of the vehicle (the operating condition), the traveling state (stop, travel, speed, right turn, left turn, idling stop, ON/OFF of engine, etc.,) or the movement state of the position. Each log is identified by identification data (ID), for example, controller area network (CAN)-ID. A code may be any type of code as long as the validity of the target data can be verified. For example, a hash, a message authentication code (MAC), a message integrity code (MIC) or a cyclic redundancy check (CRC) is used. The feature of communication data should be information for identifying communication data, and includes at least identification data (CAN-ID, IP address, etc.,) corresponding to a communication network (CAN/CAN-FD, in-vehicle Ethernet [registered trademark], etc.,) and the data size.

FIG. 1 is a block diagram showing a configuration when a process for verifying falsification and taking measures against abnormality is performed for the in-vehicle log data transmitted from a plurality of vehicles as a vehicle management system according to an embodiment.

The vehicle management system shown in FIG. 1 comprises a plurality of vehicles 1A, 1B, . . . , on which an electronic apparatus is mounted, wired or wireless communication channels 2A, 2B, . . . , for transmitting the in-vehicle log data generated in vehicles 1A, 1B, . . . , and a cloud 3 which manages vehicles 1A, 1B, . . . , based on the in-vehicle log data transmitted from vehicles 1A, 1B, . . . . The cloud 3 comprises a log server 31 and an analysis server 32.

The electronic apparatus 11 shown in FIG. 2 is mounted on vehicles 1A, 1B, . . . . The electronic apparatus 11 comprises an automated driving function and a function for communicating with outside in addition to the conventional traveling function.

The log server 31 comprises a communication function for collecting in-vehicle log data from vehicles 1A, 1B, . . . , through communication channels 2A, 2B, . . . , a falsification detection function for confirming whether in-vehicle log data altered, and a function for communicating with another server provided in the cloud 3. It is assumed that the log server 31 is secured. In the log server 31, data is difficult to alter.

The log server 31 verifies whether the in-vehicle log data transmitted from vehicles 1A, 1B, . . . , is altered. The log server 31 inputs in-vehicle log data which is not altered and an abnormality state indicating discovered falsification to the analysis server 32 in a lump.

The analysis server 32 comprises a function for communicating with another server provided in the cloud 3, a function for detecting and analyzing abnormality, a function for determining measures against abnormality, and a communication function for transmitting measures against abnormality to vehicles 1A, 1B, . . . . The analysis server 32 performs a process for detecting abnormality or analyzing an accident based on the data transmitted from the log server 31. When temporary measures are present, the analysis server 32 transmits the measures to the target vehicle.

In the present embodiment, the log server 31 is different from the analysis server 32. However, their functions may be mounted on the same server depending on the need.

As shown in FIG. 2, the electronic apparatus 11 mounted on vehicles 1A, 1B, . . . , mainly comprises an electronic control unit (ECU) group 111, a gateway 112, a log system 113, and communication modules 114 and 115.

In each of the split domains based on a control function, etc., the units of the ECU group 111 are connected to an actuator corresponding to the domain, and control operation for vehicle driving in a coordinated manner through intercommunication by an operation control command of the driver or automated driving system.

The gateway 112 performs the transmission of communication packets mainly between the units of the ECU group 111 and between the outside and inside of the vehicle. The log system 113 is connected to the gateway 112, and records the information generated in the vehicle including communication data as in-vehicle log data.

The communication modules 114 and 115 transmit communication data from the outside to inside of the vehicle or from the inside to outside of the vehicle through the respective communication channels. For example, the communication module 114 is connected to the gateway 112, and performs communication between the gateway 112 and another connected car or an infrastructural traffic light in accordance with a near field communication of 700 MHz. The communication module 115 is connected to the log system 113, and transmits the information of log data, etc., from the log system 113 to the log server 31 on the cloud 3 side via a network for mobile phones.

In terms of information security, the electronic apparatus 11 should be preferably set in the communication module 115 such that data cannot be input from outside to prevent the preparation of an attacking route from outside. The gateway 112 and the log system 113 may be integrally formed depending on the need.

FIG. 3 shows the specific functional configuration and relationships of the electronic apparatus 11, the log server 31 and the analysis server 32 of the vehicle management system according to the present embodiment.

The gateway 112 comprises a communication unit 1121, a storage unit 1122, a transmission processor 1123 and a time management unit 1124.

The communication unit 1121 receives communication data via the gateway 112. The storage unit 1122 is a volatile memory and temporarily holds the received communication data. The transmission processor 1123 transmits the received communication data to each domain inside the vehicle or the outside of the vehicle based on destination information. When the communication data stored in the storage unit 1122 reaches a certain amount, the communication data is transmitted to the log system 113 as in-vehicle log data. The time management unit 1124 performs a process for adding the time information of the local clock of the gateway 112 at an appropriate time point to the received communication data. In the present embodiment, time information is added with accuracy in ms units. However, time information may be added with accuracy in s units or μs units in accordance with the actual request.

The log system 113 comprises a communication unit 1131, a storage unit 1132, a hierarchical related information generation unit 1133, a cryptography processor 1134, a recording unit 1135, a writing processor 1136, a reading processor 1137 and a transmission processor 1138.

The communication unit 1131 receives the in-vehicle log data transmitted from the gateway 112. The storage unit 1132 is a volatile memory and temporarily holds the received in-vehicle log data. The hierarchical related information generation unit 1133 performs a process for generating a hierarchical verification value and associated information corresponding to the in-vehicle log data.

The code of associated information may be any type of code as long as it can identify the logs to be verified. The communication unit 1121 of the gateway 112 and the communication unit 1131 of the log system 113 may be the same. The hierarchical rule to be referred to when the hierarchical verification value is generated may be either a file defined in advance and stored in the storage unit 1132 or a file in which a command from a server on the cloud 3 side is temporarily stored in the storage unit 1132.

The cryptography processor 1134 mainly performs a process for generating falsification verification values. The storage unit 1135 stores in-vehicle data and information such as an encryption key necessary for the process of the log system 113 for long periods. The writing processor 1136 performs a process for writing in-vehicle log data to the storage unit 1135. The reading processor 1137 performs a process for reading in-vehicle log data from the storage unit 1135. The transmission processor 1138 transmits the generated hierarchical related information or the read in-vehicle log data to the log server 31 on the cloud server 3 side. In consideration of information security, the system is configured such that only the data transmitted from the inside to outside of the vehicle, in other words, outbound data, passes through the transmission processor 1138.

The log system 113 processes hierarchical related information in the procedure shown in FIG. 4. After the communication unit 1131 receives log data from the gateway 112 (step S11), the system determines whether a space is present in the storage unit 1132 (step S12). When a space is not present, the system deletes a certain amount of data from the oldest from the storage unit 1132 (step S13). The system determines whether a certain amount of data is stored in the storage unit 1132 (step S14). When a certain amount of data is not stored, the system moves to the reception process of step S11. When a certain amount of data is stored, the system generates hierarchical related information in the hierarchical related information generation unit 1133 (steps S15 and S16). The hierarchical related information includes a hierarchical verification value and associated information. The hierarchical related information is generated with reference to a hierarchical rule. The hierarchical rule can be shared with the log server 31 of the cloud 3 in advance or specified from the log server 31. Specifically, the hierarchical rule is a file defining the rule for classifying the tiers and the method for generating the associated information of each tier.

For example, the following four tiers are formed for a group of data items.

First tier: The target is the whole data. Associated information defines the time information of the head and end, and the number of items of the whole data.

Second tier: The data is classified by the types of networks. Associated information indicates the title of the type of each network and the number of data items corresponding to the title.

Third tier: The data is further classified by the identifiers of the transmission sources based on the classification of the second tier. Associated information indicates each identifier and the number of data items corresponding to the identifier.

Fourth tier: The target is each data item. Here, associated information is unnecessary.

In the above manner, the number of tiers of the hierarchy, and the classification rule and the method for generating associated information in each tier are defined.

After the hierarchical related information is generated, the information is transmitted to the log server 31 via the transmission processor 1138 (step S17). The system determines whether the transmission succeeds (step S18). When the transmission does not succeed, the system determines whether a certain amount of log data is stored in the storage unit 1132 (step S19). When a certain amount of log data is not stored, the process returns to step S17 to transmit the hierarchical related information. When a certain amount of log data is stored in step S19, the system temporarily stores unsent hierarchical related information in the storage unit 1132.

When the transmission succeeds in step S18, the system writes the target log data to the storage unit 1135 in the writing processor 1136 (step S21). The system determines whether the writing succeeds (step S22). When the writing does not succeed, the system determines whether a certain amount of log data is stored in the storage unit 1132 (step S23). When a certain amount of log data is not stored, the process returns to step S21 to write the hierarchical related information (step S24). When a certain amount of log data is stored in step S23, the system temporarily stores unwritten hierarchical related information in the storage unit 1132. When the writing succeeds in step S22, the system terminates a series of steps and proceeds to the process of the next log data.

The log data written to the storage unit 1135 is transmitted to the log server 31 later in series. Log data is transmitted at regular intervals (every 30 minutes) or based on the trigger defined in advance (for example, when the engine of the vehicle on which the electronic apparatus 11 is mounted is turned off).

FIG. 5 shows an example of communication log data and corresponding hierarchical verification values and associated information. In FIG. 5, columns A to C are the main part of the data of communication logs. The main part includes identifiers, communication data and time. In the chart, columns D to G indicate hierarchical verification values. In the present embodiment, the structure has four tiers. Column D indicates a verification value corresponding to each log data item in the fourth tier. Column E indicates a verification value corresponding to a group of log data items based on each identifier number in the third tier. Column F indicates a verification value corresponding to a group of log data items based on each log data type in the second tier. Column G indicates a verification value corresponding to the whole log data in the first tier. In the chart, columns H to J indicate associated information corresponding to the hierarchical verification values. In the lowest tier (fourth tier), a one-to-one relationship is applied to the log data items. Thus, associated information is unnecessary.

However, since there is a need to sort log data in accordance with the hierarchical rules, the order of the verification values of the tiers other than the first tier may be different from that of the main part of log data illustrated in FIG. 5.

Now, this specification explains the configuration of the log server 31 and the analysis server 32 of the cloud 3.

In FIG. 3, the log server 31 comprises a communication unit 311, a storage unit 312, a recording unit 313, a matching unit 314, a falsification verification unit 315, a cryptography processor 316, an input data generation unit 317 and a transmission processor 318.

The communication unit 311 receives the in-vehicle log data and hierarchical related information transmitted from the electronic apparatus 11 of the vehicle, etc. The storage unit 312 temporarily stores the received data of the communication unit 311. The recording unit 313 records the received data temporarily stored in the storage unit 312. The recording unit 313 stores a hierarchical rule defined in advance.

The matching unit 314 obtains the associated information of the first tier from the received data and picks up appropriate hierarchical related information from the storage unit 313 in accordance with the hierarchical rule defined in advance. The falsification verification unit 315 verifies whether the log data is altered based on the result of matching of the matching unit 317. The cryptography processor 316 mainly performs a process for generating falsification verification values.

The input data generation unit 317 collects the results of falsification verification of the tiers as general input data (in which verification succeeds) or abnormal input data (in which verification fails). The transmission processor 318 transmits the general/abnormal input data generated in the input data generation unit 317 to the analysis server 32 via the communication unit 311.

The analysis server 32 comprises a communication unit 321, an analysis unit 322, a measure generation unit 323 and a transmission processor 324.

The communication unit 321 receives the input data transmitted from the log server 311. The analysis unit 322 analyzes the received input data and detects the presence or absence of abnormality. When an abnormality is detected as a result of analysis of the analysis unit 322, the measure generation unit 323 generates control information for the measures against the abnormality. The transmission processor 324 transmits the measure control information generated in the measure generation unit 323 to the electronic apparatus 11 of the vehicle via the communication unit 321.

In the configuration of the cloud 3, the procedure of a process for verifying falsification in the log server 31 is explained with reference to FIG. 6.

The log server 31 receives the in-vehicle log data and hierarchical related information transmitted from the electronic apparatus 11 of the vehicle, etc., in the communication unit 311 (step S31), temporarily holds the received data in the storage unit 312, writes the data to the recording unit 313 in series (step S32) and starts to verify falsification. The matching unit 314 obtains the associated information of the first tier from the received data and picks up hierarchical related information corresponding to the associated information from the recording unit 313 in accordance with the hierarchical rule defined in advance (step S33).

The details of the matching process are explained, using the first tier as an example. The hierarchical rule is assumed to be defined such that the associated information of the first tier includes the time information of the first and last log data items and the number of log data items. In this case, when a group of log data items is received, the time information of the first and last log data items and the information of the number of log data items are extracted. The extracted time information and the extracted number of log data items are compared with the associated information of the hierarchical related information stored in the recording unit 313. Only when both the time information and the number of log data items of the received group of log data items are the same as those of the hierarchical related information stored in the recording unit 313, the matching succeeds. The hierarchical related information is picked up.

Whether the above matching succeeds is determined (step S34). When the matching fails (unsuccessful), to secure a lot of data items which are not altered, the log server 31 applies a comparison process to the associated information of the first tier and the tiers lower than the first tier in the matching unit 314 (step S35), transmits only the portions in which the matching succeeds to the falsification verification unit 315, and verifies falsification (step S36). The order of the comparison of the first tier and the tiers lower than the first tier may be determined based on the associated information. For example, verification may be performed in the ascending order of the number of data items of the associated information.

A case where the matching fails (unsuccessful) indicates that the first/last transmitted log data item has been already rewritten or data has been deleted. In steps S35 and S36, to secure as many data items which are not altered as possible, the log server 31 searches the lower tiers for a tier in which matching succeeds, and verifies the falsification of the tier in which matching succeeds. The log server 31 collects data items which are not altered as general input data together with the information of an abnormal state (abnormal input data) in the input data generation unit 317 (step S37), and transmits the data to the analysis server 32 in the transmission processor 318 (step S38).

When the matching succeeds in step S34, the log server 31 uses the verification value of the first tier to verify the falsification of the received in-vehicle log data items as a whole (step S39), and determines whether the data items are altered (step S40). When the verification succeeds, the log server 31 determines that the group of data items is not altered, and collects all the in-vehicle log data items received in the input data generation unit 317 as the general input data of the analysis server 32.

When the verification fails in step S40 and the log server 31 determines that the group of data items is altered, the log server 31 classifies the data items in the next tier in accordance with the hierarchical rule. After the classification, the log server 31 verifies falsification with the verification values and associated information of the second tier from the portion in which the number of data items is less. Further, the log server 31 specifies an altered portion, and successively narrows the range with the verification values and associated information of the third tier and the verification values of the fourth tier (step S42). Based on the narrowed range and the hierarchical rules, it is possible to presume abnormal information such as the cause of falsification or the generation time period of falsification. In this process, in the input data generation unit 317, the log server 31 collects the results of verification of the tiers as general input data (in which verification succeeds) or abnormal input data (in which verification fails). The log server 31 performs verification for all the tiers to the lowest tier (step S44). After all the tiers are verified, the log server 31 moves to step S38 and transmits the input data to the analysis server 32. When the transmission succeeds, the log server terminates a series of steps and loads the next log. When the transmission does not succeed, the log server 31 temporarily stores the input data in the storage unit 312 for the next time.

As described above, in the vehicle management system of the present embodiment, in the process for verifying falsification, the range is gradually narrowed in order from the upper tier. Thus, there is no need to verify all the data items at all times. The whole processing time can be reduced to a certain extent.

In the hierarchical verification, in-vehicle log data is verified for each split group unit. There is no need to verify each data item of a group having no problem. Thus, it is possible to quickly specify a portion having a problem. The falsification verification for the target log data can be quickly terminated. Thus, the log data of a large number of vehicles can be processed in a unit of time.

Since hierarchical related information is firstly transmitted to the log server of the cloud, it is possible to confirm at a glance whether or not the main part of log data is deleted based on associated information. Further, the range of deletion can be narrowed to a certain extent based on hierarchical verification values.

Further, hierarchical related information is not stored in the log recording medium of the vehicle. Thus, a certain space is secured. In this way, a large number of in-vehicle log data items can be secured even with a recording medium having the same capacity with the same cost.

The gateway 112 and the log system 113 may be integrated as a structure including a function for generating hierarchical related information, etc. It is possible to define a hierarchical rule different from that of the above embodiment. The process may be performed with the number of tiers different from that of the above embodiment. The hierarchical rule can be dynamically defined. For example, the hierarchical rule is dynamically selected from the files provided in advance based on the state of the vehicle. Alternatively, a hierarchical rule defining the effective range is received from the log server. When the hierarchical rule is dynamically defined, information equivalent to the identifier of the hierarchical rule should be input to the associated information of the first tier. The hierarchical rules of the second and third tiers are determined based on, for example, one of the state of the vehicle, the position of the vehicle, the traveling state of the vehicle and the feature of communication data.

The electronic apparatus and servers used for the vehicle management system of the present embodiment may be realized by using a general-purpose computer device as basic hardware. Each functional block may be realized by causing a processor mounted on the computer device to execute a program.

Figure 7:
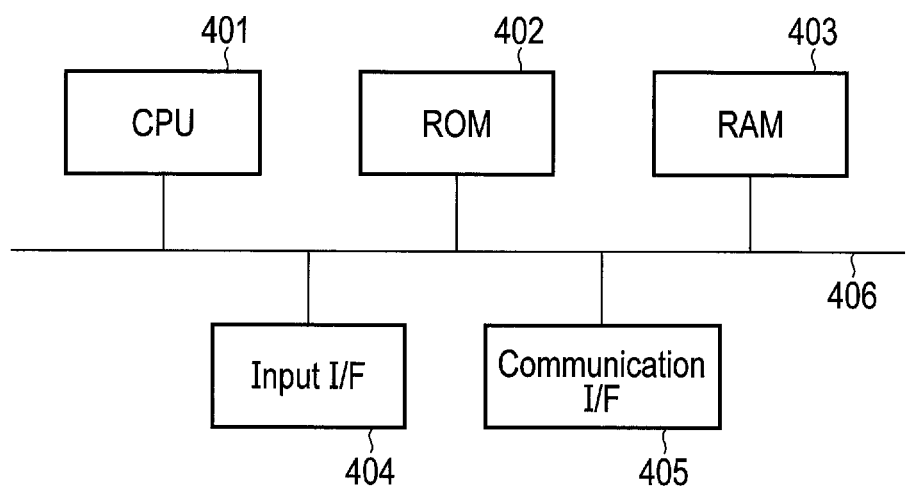
FIG. 7 is a block diagram showing the configuration of a computer device applicable to the vehicle management system according to the embodiment.

As shown in FIG. 7, a computer device applicable to the electronic apparatus or servers of the vehicle management system having the above configuration comprises a control device such as a central processing unit (CPU) 401, a read only memory (ROM) 402, a storage device such as a random access memory (RAM) 403, an input-output I/F 404 connected to a microphone, an operation input device, a display device, etc., a communication I/F 405 which performs communication via a network, and a bus 406 connecting each unit. The computer device may be realized by installing the above program into the computer device in advance. The computer device may be realized by storing the program in a storage medium such as a CD-ROM or distributing the program via a network and installing it into the computer device when needed. Each functional block may be realized by appropriately using a memory or hard disk provided inside or outside the computer device or a storage medium such as a CD-R, CD-RW, DVD-RAM or DVD-R.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus used in a vehicle, comprising:
    generator circuitry configured to generate a log of the vehicle and a code used to verify validity of the log; and
    transmitter circuitry configured to transmit the log of the vehicle to a server, wherein the generator circuitry is configured to generate:
        a first log of the vehicle for a first period of time;
        a first code used to verify validity of the first log;
        a second log of the vehicle for a second period of time;
        a second code used to verify validity of the second log;
        a third log of the vehicle for a third period of time;
        a third code used to verify validity of the third log;
        a fourth log of the vehicle for a fourth period of time;
        a fourth code used to verify validity of the fourth log;
        a fifth code used to collectively determine a validity of the first log and the second log;
        a sixth code used to collectively determine a validity of the third log and the fourth log;
        a seventh code used to collectively determine a validity of the first to fourth logs;
        first information indicating that the validity of the first log and the second log is allowed to be collectively verified by the fifth code;
        second information indicating that the validity of the third log and the fourth log is allowed to be collectively verified by the sixth code; and
        third information indicating that the validity of the first to fourth logs is allowed to be verified by the seventh code, and
    wherein the transmitter circuitry is configured to transmit the first to seventh codes to the server, and transmit the first to fourth logs to the server after a transmission of the first to seventh codes, and transmit the first information, the second information and the third information to the server before the transmitter circuitry transmits the first to fourth logs to the server,
    the server includes reception circuitry and processor circuitry,
    the reception circuitry is configured to receive the first to seventh codes from the electronic apparatus mounted on the vehicle, and the reception circuitry subsequently receives the first to fourth logs; and
    the processor circuitry configured to verify the seventh code to determine the validity of the first to fourth logs collectively, treats the first to fourth logs as valid logs when the seventh code is valid, and determines validity of at least one of the first to fourth logs using at least one of the fifth code or the sixth code when the seventh code is invalid, and determines an order of using the fifth code and the sixth code based at least in part on the first information, the second information and the third information.

2. The electronic apparatus of claim 1, wherein validities of two or more logs that are allowed to be collectively determined is determined based at least in part on a state of the vehicle.

3. The electronic apparatus of claim 1, wherein validities of two or more logs that are allowed to be collectively determined is determined based at least in part on a position of the vehicle.

4. The electronic apparatus of claim 1, wherein validities of two or more logs that are allowed to be collectively determined is determined based at least in part on a traveling state of the vehicle.

5. The electronic apparatus of claim 1, wherein validities of two or more logs that are allowed to be collectively determined is determined based at least in part on a feature of communication data of the vehicle.

* * * * *